United States Patent [19]
Mazzola

[11] 3,903,514
[45] Sept. 2, 1975

[54] STAY-AWAKE ALARM

[76] Inventor: Joseph Mazzola, 67 Belmont Ave., Plainview, N.Y. 10570

[22] Filed: Oct. 3, 1973

[21] Appl. No.: 403,010

[52] U.S. Cl. ............................. 340/279; 340/278
[51] Int. Cl.² ....................................... G08B 21/00
[58] Field of Search.......... 340/279, 278, 63, 213 R; 280/150 B, 150 R; 180/82 R, 102, 101, 82.7, 99

[56] References Cited
UNITED STATES PATENTS

| | | | |
|---|---|---|---|
| 2,215,985 | 9/1940 | Stankey | 340/279 |
| 2,754,497 | 7/1956 | Wolpert | 340/279 |
| 2,842,628 | 7/1958 | James | 340/279 |
| 3,054,868 | 9/1962 | Phillians | 340/279 |

Primary Examiner—John W. Caldwell
Assistant Examiner—Donnie L. Crosland
Attorney, Agent, or Firm—Friedman & Goodman, Esqs.

[57] ABSTRACT

An alarm for detecting deviations in body movements of a driver of a vehicle from a predetermined upright driving position includes a generally U-shaped yoke adapted to be mounted on a headrest or the upper portion of a seat proximate to the driver's body in a normal upright driving position thereof. Normally open lateral switches are mounted on the yoke on each side of the driver's head in the normal position thereof. A normally opened switch is mounted on the yoke in back of the driver's head. The actuators on the normally open switches are positioned to contact the driver's head when the same deviates dangerously to one side or rearwardly. To detect excessive frontal movements of the driver's head or his body, a pivotally mounted plate is supported on the yoke which cooperates with a normally closed switch when the plate is resiliently biassed to its normal forward position. The normally open switches close an alarm circuit when the actuators thereof contact the driver's head. On the other hand, the normal position of the driver depresses the pivotally mounted plate and opens the normally closed switch, the latter switch closing only in response to excessive frontal movement of the driver.

8 Claims, 4 Drawing Figures

STAY-AWAKE ALARM

BACKGROUND OF THE INVENTION

The present invention generally relates to alarms, and more particularly to a stay-awake alarm for vehicles which is actuated in response to excessive or dangerous deviations of a driver from a predetermined normal upright driving position.

A common cause for automobile accidents is the loss of control of a vehicle by a driver who falls asleep at the wheel. Driving in a state of exhaustion or driving for an extended period of time, particularly night driving, can cause a driver to become drowsy and enter into a state of sleep. Driving for very long periods of time also tends to cause the driver to enter a state not unlike hypnosis, wherein the driver is not fully responsive and his reflexes are not sufficiently quick to effectively control the automobile. The same problem exists with respect to drivers of other vehicles such as trains, airplanes, and the like.

In the aforementioned state of the driver, the drowsiness and initial stages of sleep are typically accompanied by excessive movements or deviations of the body of the driver from a predetermined upright, normal driving position. While numerous alarms are known, none of the alarms are useful for sensing these dangerous deviations of the driver's body at the initial or early stages thereof. The present invention is an alarm adapted for this purpose which generates an audible alarm signal when the driver's body dangerously deviates from predetermined or preset tolerable limits. As soon as the driver's head or body deviate beyond these limits, the alarm is loudly sounded to awake the driver and/or remind the driver that he is not in a condition to drive the vehicle.

SUMMARY OF THE INVENTION

Accordingly, it is an object of the present invention to provide a stay-awake alarm for vehicles for providing notice to the driver that his head and/or body is deviating dangerously from a predetermined upright driving position, this indicating that the driver is not in condition to drive the vehicle.

It is another object of the present invention to provide an alarm as above suggested which is simple in construction and economical to manufacture.

It is still another object of the present invention to provide a stay-awake alarm for automobiles which detects excessive lateral, rearward or frontal movement of the driver's head and/or body.

It is yet another object of the present invention to provide a alarm of the type above described which can be mounted on a headrest or the upper portion of a seat of an automobile, the alarm being provided with sensing switches disposed about the driver's head and/or body for detecting excessive movements thereof from a predetermined upright driving position.

It is a further object of the present invention to provide an alarm which generates a loud audible signal whenever a driver of a vehicle moves excessively from a predetermined upright driving position, to awake the driver or remind the driver that he is not in condition for operating the vehicle.

In order to achieve the above objects, as well as others which will become apparent hereafter, an alarm for detecting deviations of body movements of a driver of a vehicle from a predetermined upright driving position includes support means adapted to be positioned proximate to the driver's body in the normal upright driving position thereof. Switch means are provided which are mounted on said support means for sensing dangerous deviations of the driver's body from said predetermined position. Alarm indicating means are provided connected to said switch means for generating an alarm signal when said switch means detects a dangerous deviation of the driver's body.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which.

DESCRIPTION OF THE PREFERRED EMBODIMENTS

Figure 1:
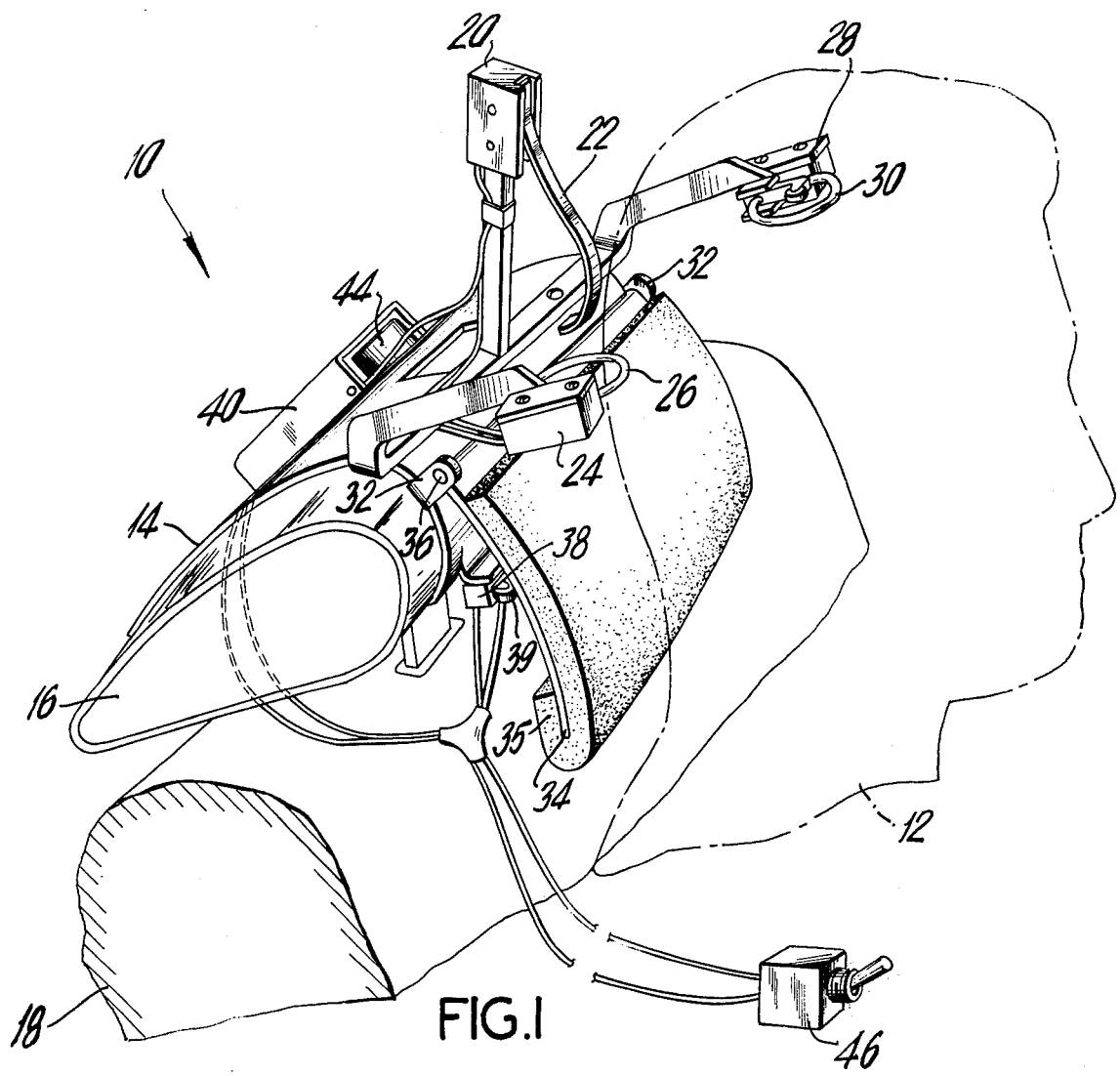
FIG. 1 is a perspective view of the alarm of the present invention mounted on a headrest of an automobile seat, showing the head of a driver in phantom positioned in a predetermined upright driving position wherein the alarm is not actuated.
Figure 2:
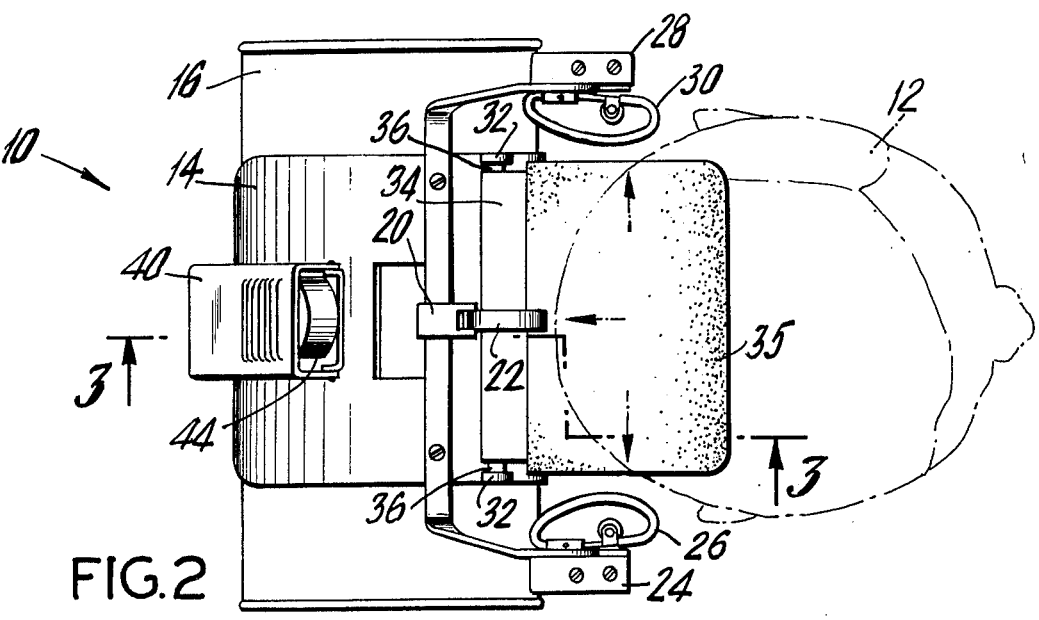
FIG. 2 is a top elevational view of the alarm shown in FIG. 1.
Figure 3:
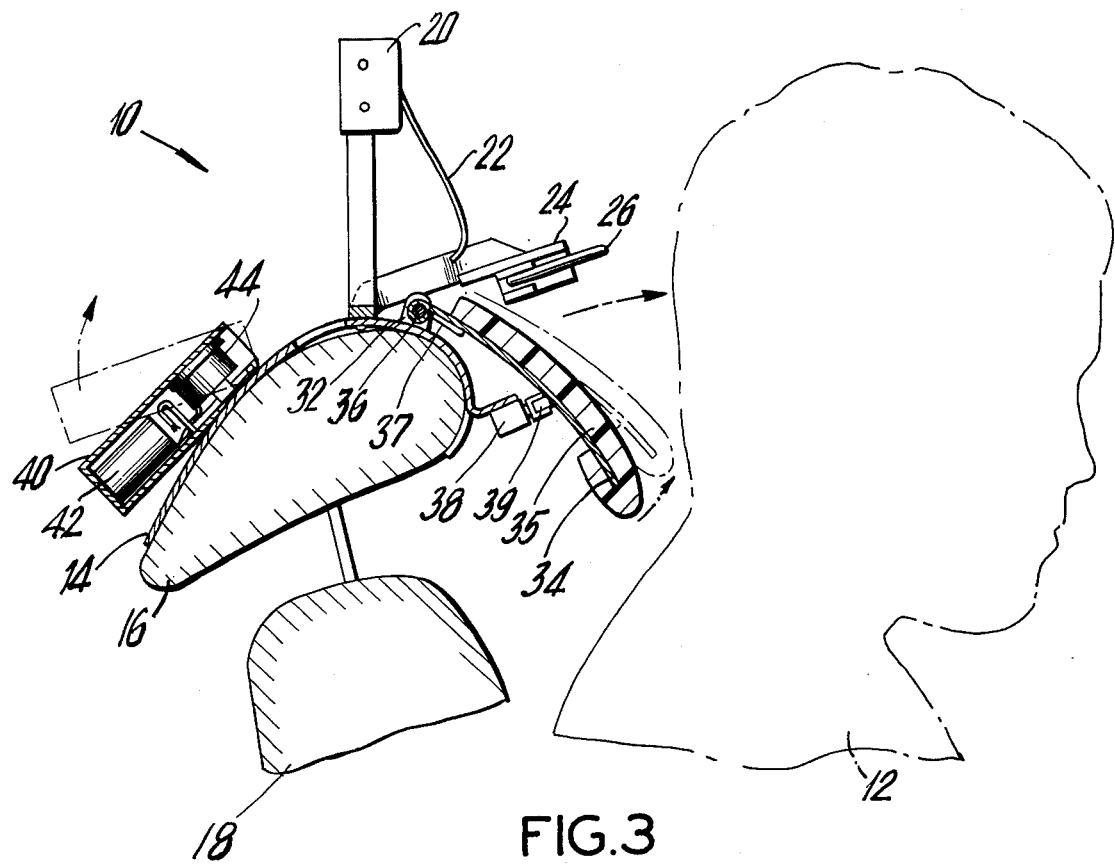
FIG. 3 is a cross sectional view of the alarm shown in FIG. 3, taken along line 3—3, further showing excessive frontal movement of the driver and corresponding release of a normally depressed plate to actuate the alarm.

Referring now specifically to the drawings, wherein identical or similar parts have been designated by the same reference numerals throughout, and first referring to FIGS. 1–3, a stay-awake alarm of the present invention is generally designated by the reference numeral 10. The automobile alarm 10 is utilized, as will be described hereafter, for detecting deviations in body movements of an automobile driver 12 from a predetermined normal upright driving position. However, it should be clear that the alarm 10 can equally be used, in conjunction with any other vehicle, such as trains, boats and airplanes.

The alarm 10 includes support means in the form of a U-shaped yoke 14 which is configurated to at least partially receive and be mounted on either a headrest 16 or the upper portion of a seat 18. In both cases, the yoke is positioned proximate to the driver's body in the normal upright driving position thereof. The yoke may be flexible to conform to the configuration of the seat or headrest or may be rigid.

Mounted on the headrest generally centrally thereof is a microswitch 20 the actuator 22 of which extends towards the driver. The switch 20 is normally open when the actuator 22 is not depressed.

Mounted laterally on one side of the yoke 14 is a microswitch 24 whose actuator 26 is inwardly directed towards the driver. Similarly, a microswitch 28 is provided on the other side of the yoke with the actuator thereof extending inwardly towards the driver's head when the latter is disposed between the two switches 24, 28. The switches 24 and 28 are also normally open switches when the respective actuators thereof are in non-depressed conditions.

Provided on the yoke 14 are a pair of lugs 32 which project beyond or extend above the outer surface of the yoke. A resiliently or biassed pivotally mounted plate 34 is supported between the lugs 32 by means of a pin 36 which extends between the lugs. The plate is shown at least partially covered with a padding 35 against which the driver's head or neck or upper back can rest.

As can best be seen in FIG. 3, a helical spring 37, or any other suitable spring, is provided which acts between the yoke 14 and the plate 34 to urge the latter to move towards the right, as viewed in FIG. 3, or towards the driver.

Mounted on the yoke 14 is a microswitch 38 the actuator 39 of which abuts against the plate 34. The switch 38 is a normally closed switch when the actuator 39 is fully extended and opens when the actuator is depressed. Accordingly, the spring 37 has the effect of closing the switch 38 when the plate 34 is pivotted to its alarm position, as shown in dashed outline in FIG. 3.

Figure 4:
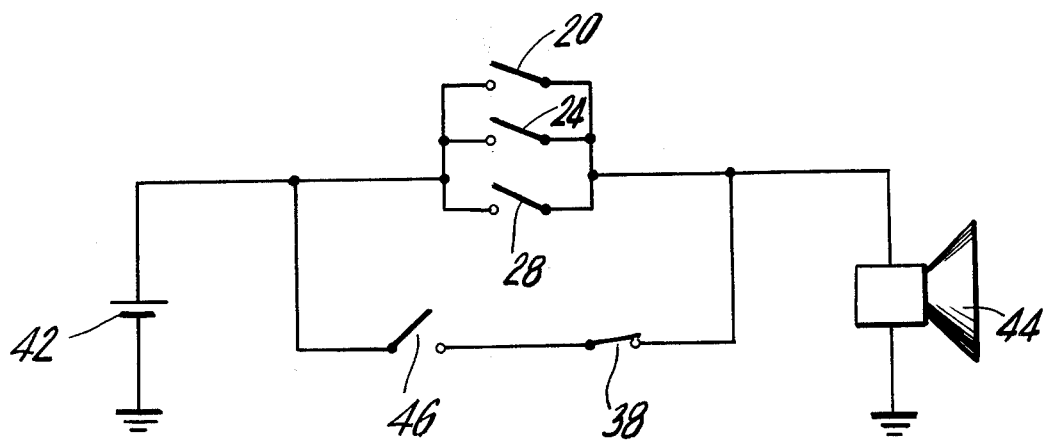
FIG. 4 is an electrical schematic of the circuit of the alarm which incorporates the normally open switches for detecting excessive lateral and rearward movement of the driver's head and a normally closed switch for detecting excessive frontal movement of the driver's head or body.

A case 40 is mounted on the yoke 14 which houses the electrical circuitry for the alarm 10. Referring to FIGS. 3 and 4, the case 40 includes a battery 42 and a horn 44 or other suitable sound generating device. It should be clear, however, that in addition or in place of an audible alarm, suitable electric circuitry may be provided for imparting to the driver a physical impact or electrical shock, for example, which may be more effective in maintaining the driver in an awakened state. A single-pole, single-throw switch 46 is connected in series with the normally closed switch 38 which can be manually operated by the driver.

The operation of the stay-awake alarm will now be described. With the switches of the alarm positioned to correspond to the limits of tolerable movements of the driver, the driver positions his head between the switches 24 and 28 and in front of the switch 20 without contacting the actuators of the switches. That the driver positions his head sufficiently rearwardly is assured by the switch 38. Thus, referring to FIG. 4, it will be noted that the closing of any of the normally open switches 20, 24 or 28 actuates the alarm. On the other hand, the closing of the normally closed switch 38, with the switch 46 closed, similarly actuates the alarm. To open the switch 38, the driver must sufficiently depress the plate 34 to bring his head between the switches 24 and 28 as contemplated by the invention.

When the driver's head dangerously deviates towards the right, the actuator 26 is depressed and the switch 24 closes to actuate the alarm. Similarly, excessive leftward movement of the head depresses the actuator 30 and the alarm is initated due to the closing of the switch 28. Similarly, dangerous movements of the driver in a rearward position depresses the actuator 22 to close the switch 20, again energizing the alarm.

The switch 46 is provided to disable the alarm while the driver is initially seating himself or is leaving the automobile. Clearly, whenever the driver is not fully depressing the plate 34, the alarm would be energized except for the switch 46 which may manually disable the effect of the switch 38. However, as soon as the switch 46 is closed, any dangerous frontal movements of the plate 34, as suggested by the dashed outline in FIG. 3, closes the switch 38 and energizes the alarm to sound the horn 44.

While the alarm 10 has been shown in a prototype form with the switches exposed, it should be clear that a suitable headrest can be provided which houses or covers the various switches to make the alarm more aesthetically pleasing.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. An alarm for detecting deviations in body movements of an operator of a vehicle from a normal predetermined upright sitting position while sitting on a seat of the vehicle, the alarm comprising support means adapted to be rested on a portion of a vehicle seat proximate and behind the back of an operator; a plurality of switch means mounted on said support means for sensing dangerous deviations of the operator's body from said predetermined upright sitting position, the operator's body normally connecting only one of said switch means during operation of the vehicle, said one switch means being actuated only when the driver's back ceases to make contact with the same, and the other of said switch means being distributed about the operator's head and being actuated only when contact is made between the same and the operator's head; a manually operable switch connected in series with said one switch means; and alarm indicating means connected to said switch means for generating an alarm signal when said manually operable switch is closed and any one of said switch means is actuated to detect a dangerous deviation of the driver's body.

2. An alarm as defined in claim 1, wherein said support means comprises a yoke configured to receive an upper portion of a seat of a vehicle proximate to the driver's shoulders.

3. An alarm as defined in claim 1, wherein a head rest is provided on the vehicle seat and wherein said support means comprises a yoke configured to receive a portion of the head-rest mounted on a seat of a vehicle.

4. An alarm as defined in claim 1, wherein said switch means comprises a plurality of micro switches spaced from each other and variously positioned around the driver for engagement with the driver's body when the same dangerously deviates from said predetermined upright driving position.

5. An alarm as defined in claim 4, wherein said alarm circuit means comprises a series connected closed circuit including electrical energy supply means and alarm signal generating means, three of said switches comprising normally open switches connected in parallel to each other and each connected in series with said closed circuit, one of said normally open switches being disposed on each side of the driver's head and one of said normally open switches being disposed in back of the driver's head, whereby excessive sideward or rearward movement of the driver's head closes one of said normally open switches to thereby close said series connected circuit and energize said alarm signal generating means.

6. An alarm as defined in claim 4, wherein said support means includes a pivotally mounted plate facing the driver and disposed behind the driver's back, biassing means urging at least a portion of said plate towards the driver to an alarm position when said support means is in an operative position mounted on a seat of the vehicle; and normally closed switch means mounted on said support means actuatable to an open condition in response to depression of said plate portion by the driver when sitting in said predetermined upright driving position said normally closed switch means closing in response to forward movement of the back of the driver and in response to biassing means urging said plate portion to said alarm position, whereby said normally closed switch means energizes said alarm circuit means in response to dangerous frontward deviations of the driver's body which permit said biassing means to move said plate portion to said alarm position.

7. An alarm as defined in claim 1, wherein said manually operable switch comprises a single-pole, single-throw switch connected in series with said one switch means, whereby the action of said normally closed switch means may be inhibited by the opening of said single-pole, single-throw switch.

8. An alarm as defined in claim 1, wherein said alarm circuit means includes an audible indicating device.

* * * * *